United States Patent
Richmond et al.

(10) Patent No.: US 9,990,035 B2
(45) Date of Patent: Jun. 5, 2018

(54) IMAGE CHANGES BASED ON VIEWER'S GAZE

(71) Applicants: Robert L Richmond, Seattle, WA (US); Jeffrey Haley, Bellevue, WA (US); Thomas Leonard Schworer, Jr., Seattle, WA (US); Maxwell Wolfe Richmond, Seattle, WA (US); Eli Newton Richmond, Seattle, WA (US); Owen Sagan Richmond, Seattle, WA (US)

(72) Inventors: Robert L Richmond, Seattle, WA (US); Jeffrey Haley, Bellevue, WA (US); Thomas Leonard Schworer, Jr., Seattle, WA (US); Maxwell Wolfe Richmond, Seattle, WA (US); Eli Newton Richmond, Seattle, WA (US); Owen Sagan Richmond, Seattle, WA (US)

(73) Assignee: Robert L. Richmond, Seattle, WA (US)

( * ) Notice: Subject to any disclaimer, the term of this patent is extended or adjusted under 35 U.S.C. 154(b) by 0 days. days.

(21) Appl. No.: 15/069,829

(22) Filed: Mar. 14, 2016

(65) Prior Publication Data

US 2017/0262052 A1    Sep. 14, 2017

(51) Int. Cl.
| | |
|---|---|
| G09G 5/10 | (2006.01) |
| G06F 3/01 | (2006.01) |
| G06F 3/0484 | (2013.01) |
| G06F 3/0487 | (2013.01) |

(52) U.S. Cl.
CPC ............ *G06F 3/013* (2013.01); *G06F 3/0487* (2013.01); *G06F 3/04845* (2013.01); *G06F 2203/04806* (2013.01)

(58) Field of Classification Search
CPC ......... G06T 11/60; G06T 19/00; G06T 11/00; G06F 9/4443; G06F 3/0481
USPC ......................................................... 345/619
See application file for complete search history.

(56) References Cited

U.S. PATENT DOCUMENTS

| | | | | |
|---|---|---|---|---|
| 5,544,295 A | * | 8/1996 | Capps | ................... G06F 3/0481 345/473 |
| 7,068,813 B2 | * | 6/2006 | Lin | ........................ G06F 3/013 351/209 |
| 7,102,792 B2 | | 9/2006 | Eschbach et al. | |
| 8,643,680 B2 | * | 2/2014 | Baldwin | ................. G06F 3/013 345/156 |
| 9,530,186 B2 | * | 12/2016 | Maack | .................. G06T 3/4084 |

(Continued)

OTHER PUBLICATIONS

"Lytro Immerge", "retrieved Jun. 20, 2017 from www. lytro.com".

*Primary Examiner* — Ke Xiao
*Assistant Examiner* — Gordon Liu
(74) *Attorney, Agent, or Firm* — Fogg & Powers LLC (57) ABSTRACT

An embodiment combines the concepts of image enhancement and gaze tracking to enhance the experience of viewing images by tracking where the viewer is looking. The result is to make the viewing experience more like viewing the original scene, or to enhance the viewing experience in new ways beyond the original experience, either automatically, or by interacting with a photographer's previously specified intentions for what should happen when the viewer looks at a particular portion of an image or images taken by that photographer.

38 Claims, 5 Drawing Sheets

(56) References Cited

U.S. PATENT DOCUMENTS

| | | | |
|---|---|---|---|
| 2004/0233219 A1* | 11/2004 | Aguera y Arcas | G06F 3/0481 345/606 |
| 2005/0047629 A1* | 3/2005 | Farrell | G06F 3/013 382/117 |
| 2010/0289796 A1* | 11/2010 | Meichsner | H04N 13/0003 345/419 |
| 2011/0157218 A1* | 6/2011 | Ptucha | G06T 11/60 345/619 |
| 2014/0226914 A1* | 8/2014 | Mocanu | G06T 5/003 382/255 |
| 2017/0200308 A1* | 7/2017 | Nguyen | G06T 3/0012 |

* cited by examiner

IMAGE CHANGES BASED ON VIEWER'S GAZE

BACKGROUND

Today's digital cameras and smart phones use computer power to enhance images for viewing either immediately or later on the screens of other devices. One example is HDR, or High Dynamic Range, where the camera quickly takes several pictures at different exposures and builds an image where all portions, even the brightest and darkest, are exposed to bring out all details.

There are also existing systems that use gaze tracking to determine how long a viewer looks at a certain ad on a web page, for the purposes of making it more attractive to the eye, or to measure the value of the advertising in terms of how much time (e.g., average time, aggregate time) how many viewers spend on it. There are also systems that use gaze tracking to see if the viewer is no longer looking at display, such as a smart phone's display, in order to stop playing a video and save battery power or make sure that the viewer does not miss any part of the video.

SUMMARY

An embodiment combines these two concepts to enhance the experience of viewing images by tracking where the viewer is looking. The result is to make the experience more like viewing the original scene, or enhance it in new ways beyond the original experience, either automatically, or by interacting with a photographer's previously specified intentions for what should happen when the viewer looks at a particular portion of an image or images taken by that photographer.

An embodiment allows an artist to create an original image for a display screen, or multiple original images for multiple display screens, that changes as a viewer looks at the image, as a function of who the viewer is or what the viewer does. The viewer's action that causes the image to change can be where the viewer directs a gaze or touches the screen, or what the viewer says or how far the viewer is from the display, or how many viewers there are, or the identity of a particular expected viewer, etc.

An embodiment is a method for modifying one or more original images displayed on one or more display screens as a function of data collected via one or more cameras capturing an image of one or more viewers' faces before the one or more display screens. The data collected may be one or more of: where location of gaze of eyes of one or more viewers is directed within the original image, or facial appearance change of one or more viewers, or amount of ambient light, or distance of a viewer from a display screen, or number of viewers, or identity of a viewer.

Brightness.

The modification may be to change brightness of a part, or all, of the original image. The brightness change can be effected by replacing the original image with a substitute image, where the contents of the substitute image are the same as the original image but with some or all pixels modified such that the brightness of at least a portion of the substitute image is different from the brightness of at least the corresponding portion of the original image. For example, a pair of photographic images can be taken with a camera where the images are essentially the same except for a different exposure. Some or all of one image can replace some, or all, of the other image to change brightness. Alternatively, an algorithm can adjust numerical brightness of some image pixels but not all image pixels as a function of actions by one or more viewers.

Focus.

The modification may be to change focus of all or a part of the original image. The change may be effected by replacement of the original image with a substitute image, where the contents of the substitute image are the same as the original image but with some, or all, pixels modified such that the focus of at least a portion of the substitute image is different from the focus of at least the corresponding portion of the original image. The modification may be to change the focus to objects that appear to be close in a part of, or in all of, the image. The modification may be to change the focus to objects that appear to be far away in a part of, or in all of, the image. The modification may be to change the apparent depth of field of part of, or all of, the image. The modification may be to zoom in or out with the zooming centered on a part of the original image. The modification may include replacement of the original image with a substitute image. The modification may be to zoom in or out in synchrony with changes in measured distance from a display screen to a viewer.

Color.

The modification may be to change the color balance or color saturation or color depth or contrast of part of, or all of, the image. This may be effected by replacement of the original image with a substitute image, where the contents of the substitute image are the same as the original image but with some or all pixels modified such that the color (e.g., color balance or color saturation) of at least a portion of the substitute image is different from the color of at least the corresponding portion of the original image.

Sharpness.

The modification may be to change the sharpness of part of, or all of, the image. This may be effected by replacement of the original image with a substitute image, where the contents of the substitute image are the same as the original image but with some or all pixels modified such that the sharpness of at least a portion of the substitute image is different from the sharpness of the corresponding portion of the original image.

Sound Output.

The modification may be to cause or to change playing of sounds that accompany the original image.

Sprite.

The modification may be to cause movement or cessation of movement of a sprite within the original image.

Animated GIF (Graphics Interchange Format).

The modification may be to replace all or part of an image with a small set of images that together form an animated GIF.

Video Branching.

The modification may be to select a branch of a multi-branch video.

In any of the above-described embodiments, the one or more original images may be still, or video, or still with moving sprites. The original images may be two dimensional or three dimensional.

In any of the above-described embodiments, the algorithm for modification of the original image or images may be custom determined by an artist or composer or content creator who selected the one or more images. The algorithm for modification may be pre-determined by a company that supplied software for selection and use by an artist or content creator who selected the one or more original images. The algorithm may be pre-determined by a company that supplied software, and may be such that the algorithm works with any image or set of images. The algorithm may allow an artist or content creator to specify a speed at which a gradual-change modification (e.g., gradual change of brightness, gradual change of focus, gradual change of color, expanding a new image from tiny (or partial) to full, or other transition method) will be performed.

Touch or Mouse Input.

Another embodiment is a method for modifying an original one or more images displayed on one or more display screens according to an algorithm that operates as a function of data collected from touch, mouse, or other input device by the viewer, for example, touching, or pointing to, a portion of the screen within the image, where the modification is replacement of the original image with one or more substitute images where the contents of the substitute images are the same as the original image but with some or all pixels modified. The data collected by mouse might comprise data identified by one or more of: clicking or mousing over or clicking and dragging and moving. The data collected from touch may comprise data identified by one or more of: touch by one or multiple fingers, force of touch, duration of touch, movement of touch, and gestures (e.g., pinching, waving, pointing) in which a user's hands/fingers are close to, but do not contact, the image-display screen. The modification may be any of the modifications described above. The one or more original images may be still, or video, or still with moving sprites, or two dimensional, or three dimensional. The algorithm may comprise any of the elements described above.

Voice Input.

Another embodiment is a method for modifying an original one or more images displayed on one or more display screens according to an algorithm that operates as a function of data collected from voice sounds, where the modification is replacement of the original image with one or more substitute images where the contents of the substitute images are the same as the original image but with some or all pixels modified. The modification may be any of the modifications described above. The one or more original images may be still, or video, or still with moving sprites, or two dimensional, or three dimensional. The algorithm may comprise any of the elements described above.

Accelerometer Input.

Another embodiment is a method for modifying an original image displayed on a hand-held display screen according to an algorithm that operates as a function of data collected from one or more accelerometers embedded in a housing of the display screen, where the modification is to change field of view of the original image by enlarging or contracting each of one or more of the left boundary, the right boundary, the top boundary, or the bottom boundary. The data collected from the one or more accelerometers may be a tilting of a first edge of the display away from a viewer relative to an opposite edge, which tilting causes more of the image near the first edge to come into view. The modification may be to zoom in or to zoom out, with the zooming centered on a part (not necessarily the center) of the original image.

Authoring Tools.

Another embodiment is a method in a system with a server computer and a client computer to receive instructions from an author and, based on those instructions, to generate a data set for showing images that change based on actions of a viewer. The method comprises (a) receiving at the server computer from a client computer specification of a plurality of images in a sequence; (b) receiving at the server computer from the client computer specification of data to be collected that should trigger a transition from an original image in the sequence of images to a second image in the sequence of images; (c) receiving at the server computer from the client computer a specification of speed of transition from the original image in the sequence of images to the second image in the sequence of images; and (d) assembling on the server computer a data set that can be transmitted to a viewer's computer, where the data set can be viewed on the viewer's computer, and where data input received from actions of the viewer causes modification of the viewed image by replacing the original image in the sequence with the second image at the specified transition speed.

The data input may comprise, but is not limited to, one or more of: location of gaze of eyes of one or more viewers within the original image, or face-appearance change of one or more viewers, or ambient light, or distance of a viewer from a display screen, or number of viewers, or a viewer's identity, or voice input, or touch input.

The modification may comprise, but is not limited to, one or more of to change brightness of a part or all of the original image; to change focus of a part of the original image; to zoom in or out from a part of the original image; to change the color balance or color saturation or color depth or contrast of part or all of the original image; to cause movement or cessation of movement of a sprite within the original image; to select a branch of a multi-branch video.

The original image may be, but is not limited to: still, or video, or still with moving sprites, or two dimensional, or three dimensional.

The client computer and the server computer may each include a respective software program contained within a respective single computer housing, and may be activated by a single user.

DETAILED DESCRIPTION

One or more embodiments of this invention are to enhance photography and make stills and videos interactive with a viewer in, e.g., dimensions of brightness, focus, depth of field, and other qualities, either automatically, or as determined in advance by the photographer/composer and driven later by, for example, where in an image the viewer is looking.

In its simplest and most limited form, an embodiment recreates how someone would see the subject matter of a scene that was captured in a photograph, where the original scene had a very wide variation in exposure or depth. The following examples will elucidate this concept.

1. Brightness.

Imagine a band of trees with the sun setting behind them. If a viewer looks towards the sun, her irises contract, thus causing her pupils to decrease in size and let in less light and reduce brightness, and she sees the remaining half disk of the red sun (the portion of the sun not obscured by trees), but sees the trees become black silhouettes. As she looks at a single particular tree, however, her pupils open again and the character and texture of the bark on the tree become visible.

Any normal, conventional photograph of such a scene would be limited to one exposure: either dark enough to see the setting sun's shape, in which case the trees are black; or light enough to see the bark, in which case the background of the sunset becomes a white "blown out" area with no sun.

There is an existing photographic method intended to compensate for this problem, and this method is called "HDR", or High Dynamic Range. In HDR, several exposures are taken in quick succession to avoid movement, and are automatically blended so that every area of the image has the correct exposure. However, an HDR compensated image often looks "fake" or "saccharine" or "unreal" and, therefore is often unsatisfying to the viewer.

Instead, an embodiment recreates the action of the viewer's own pupil-exposure system. As with HDR, it uses a group of photographs that differ only in the exposure used when they were taken. When any one of the photographs is displayed, however, a very different thing (as compared to the HDR technique) happens.

For example, say the photograph with the sun exposed correctly is first displayed brightly on a monitor. If the viewer then looks at a blacker part of the image that was originally underexposed, like a tree in this example, the gaze tracking portion of the system detects the viewer's shift in gaze to the darker part of the image, and the system finds and displays another photograph from the set that has the area of the tree more exposed.

In this way, as the viewer's pupils expand because the viewer is looking at a very dark area, the viewer is rewarded with more image detail blossoming. A look back at the sun does the opposite: the area looks too bright and blown out, but quickly settles down into a red setting sun between the silhouetted trees. In this way, the "feeling" of looking at the original scene is rescued and recreated, and the experience of viewing is enhanced.

An embodiment gives the photographer/composer a way to record a wide range of camera and displaying variations, beyond just brightness, that she or he decides upon when taking a still photograph, and allows the viewer to trigger and explore these variations naturally by, e.g., gaze tracking or touching or mousing on the image display screen. The triggering can be manual, automatic, or according to preset intentions.

Alternatively, instead of image swapping with several images available for the swap, an algorithm can adjust the brightness (e.g., numerically) of some image pixels, but not all image pixels, in an image as a function of actions by one or more viewers.

2. Focus.

The same methods may be used for focus. For example, if the scene has objects at a variety of distances, no normal photograph can be perfectly focused for all objects, at least given a finite depth of field and the camera that took the photograph having a finite focal length. Accordingly, an embodiment can track which object in the photograph the viewer's eyes are looking at and select, from a set of many different photos each taken with a different focus, a photo that is focused correctly for that object.

3. "Walking Up to a Window"

As a viewer walks towards a display of a photograph or other image that does not take up the entire display, the increasing angle subtended by her eyes can be computed from the changing distance between the viewer and the display, and the changing distance can be measured with a camera mounted on the display, and the outside frame of the photograph can be increased while simultaneously displaying more of the photograph. This technique simulates walking up to an actual window in that more content appears as the viewer gets closer to the actual window, but the viewer may need to look left and right "through" the window to see the additional content.

4. Post Processing Effects: Cropping/Scrolling

After the camera settings are varied and photographs are taken, the photographer decides on how the image should be displayed. For example, in cropping, the photographer picks a more artistic subset of the image to present to the viewer. However, the photographer may intend for more of the image to be seen if a viewer is interested, in the following way. For example, the image can be scrolled up or down when the viewer's eye looks down or up. Done correctly, this could provide an experience of looking down into the content of the image; e.g., in a photo of a distant mountain, if the viewer looks down, he would see the trail leading up to the viewpoint. Put another way, the horizon would shift, from the distant mountain, to a few feet forward on the trail so that the portion of the trail in front of the viewer takes up most of the frame. That is, the image can be scrolled up when the viewer looks down, and can be scrolled down when the viewer looks up. Similarly the image can be scrolled right or left when the viewer looks left or right.

The same effect can be achieved with a hand-held display by using accelerometer data to scroll the image when the display is moved up, down, or sideways. That is, the hand-held display can be made to mimic a portable window that the viewer can move to view a desired portion of an image, where the image is larger than the window.

5. Shutter-Time and Movement

Imagine a still photograph showing several maple wing seeds descending. In an embodiment, several photographs of short exposure time could be taken as well as one with a longer time. When the viewer first looks at an individual seed in the photograph with the longer exposure time, she sees its wing as a blurred circle around the center. However, as she stares at it, she is shown, in quick succession, several frames formed by the photographs having the shorter exposure times (or portions of these photographs including the seed), and sees the seed actually turning quickly and falling slightly and then freezing in place (e.g., when the last of frames formed by the photographs having the shorter exposure times is displayed). While the viewer looks away from the portion of the photograph including the seed, the seed would return to its initial position and blurred appearance (e.g., the photograph, or portion thereof, with the longer exposure time would be displayed again). Then the above-described cycle would repeat when the viewer looks back at the seed.

Alternatively, when a viewer looks at an object that looks like it might be moving, such as the described maple seed, a portion of the still image can be replaced with a video image or a sprite or animated GIF showing the object moving.

This also applies to "Sequential Photography" where a moving gymnast or skier or jumper is captured in several positions against a single background. In an embodiment, only one position would be shown. As the viewer looks at the display, the other shots would be shown, leading the eye through each position across the frame . . . and backwards from the last one. This would be valuable for those (e.g., a coach or doctor) who would like to see how the captured subject is actually moving, since a single still image typically reveals less than a sequence of images that depict movement.

6. Face Appearance

Image recognition can be used to determine if a person is smiling or frowning or showing other particular emotions. Such facial changes can cause changes in a part of the image or all of the image. Image recognition can be used to determine identity of a viewer, and the determined identity can cause changes to the image.

7. Distance of a Viewer from the Display

A camera mounted on the display can be used to compute distance of a viewer from the display, and the distance can be used to cause changes to part or all of the image. (The method of measuring the distance can be any of several methods used by cameras with autofocus, such as an optical method using infrared pulses for focus detail, or an ultrasound method using sonic pulses). That is, the range-finding mechanism of the camera, which mechanism the camera may use for auto focus, can be exploited to determine the distance of a viewer from a display screen to which the camera is mounted or otherwise associated.

8. Touch by a Viewer

A touch-sensitive input layer on the face of the display can be used to receive touch input from a viewer, which touch input can be used to cause changes to part or all of the image.

9. Voice Sounds from a Viewer

A microphone mounted on, or otherwise associated with, the display can be used to receive voice input from a viewer, which voice input can be used to cause changes to part or all of the image. The voice sounds can be used to identify the viewer, and the image can be modified based on the identity of the viewer.

10. Acceleration of the Display

Where the display is hand held, input from accelerometers can be used to receive input from a viewer moving the display, input which can be used to cause changes to part or all of the image.

11. Ambient Light

A camera or other light sensor mounted on the display can be used to determine the amount of ambient light, which can be used to cause changes to part or all of the image, such as to the brightness of the image.

12. Further Capabilities

The preceding examples attempt to recreate, with more fidelity than existing imaging techniques, what the original scene looked like, and thus enhance the experience of viewing the recreating of the original scene. However, there is no reason to limit these enhancement techniques to accurate scene re-creation. These techniques can also serve as an artistic tool for the photographer/composer to lead the viewer through what he or she intended for the piece. For example, the composer may intend that the first time a viewer sees a portion of the picture, there should be a different brightness and focus than the second, or any subsequent time, that the viewer sees the portion of the picture. Or the composer may purposely blur or defocus parts of the image near where the viewer is looking to emphasize a concept or meaning implicit in the portion of the image that the viewer is concentrating on, or to purposely distract the viewer from concentration.

Detailed Example

In this section, it is shown how an embodiment accomplishes its overall objective of enhancing the experience of viewing an image, and giving the photographer a tool to more fully express her intention regarding the viewing of the image by others. Also shown are the components involved and how they work together. This explanation is shown in detail for a subset of the possible variations in the photographs, but can be easily extended to the other variations as described above using the same basic process. Therefore, this explanation is intended to be a non-limiting example of an embodiment.

Figure 1:
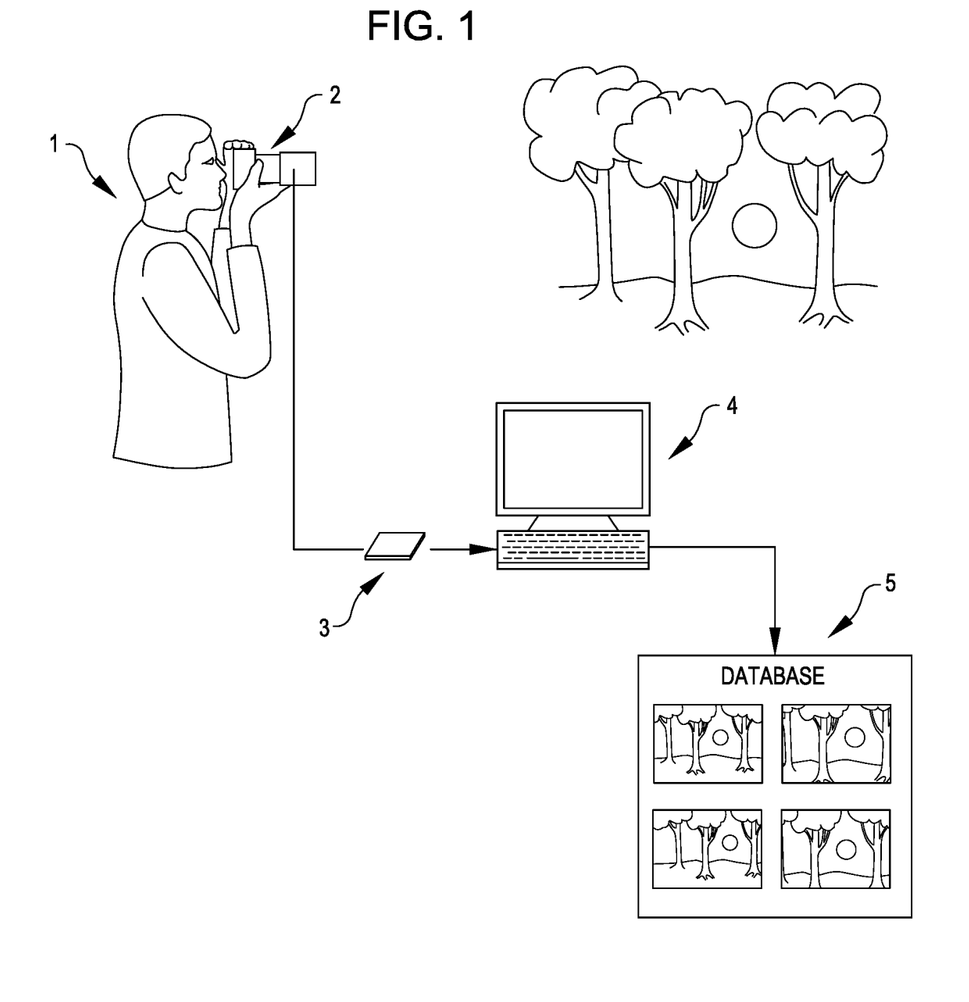
FIG. 1 shows a photographer taking multiple images of a single target, according to an embodiment.

FIG. 1 shows the image and preprocessing phase in a simple embodiment. A photographer 1 is shown using a camera 2 manually taking, or using an in-camera program to take, a set of images of a scene, with various photographic parameters varied for each image, such as brightness, focus, and shutter time.

The photographs may be transferred to a computer 4, such as via a Secure Digital (SD) card 3 or any other transfer mechanism (or the capture mechanism and circuitry already is, or already includes, a computer), then labeled and stored in a database 5. The images are then automatically analyzed and each is associated with expected actions of a viewer. For example, portions of each image that are underexposed or overexposed in one image and exposed normally in another image are automatically noted. "Underexposed" means that the details in the scene photographed are indistinguishable from black, or zero lightness. "Overexposed" means that original details are indistinguishable from white, or 100% lightness. Referring to the earlier example, the bark on the tree in front of a sunset, the images with dark in the areas of bark compared with normally exposed areas in the same place in other images are noted and that information is saved. When later the viewer looks at an underexposed location of an image, the photograph (or portion thereof) with the same location normally exposed will be swapped in. Thus the viewer, looking at an underexposed, dark and black section, where there is no distinguishable detail, would instead see the bark of the tree, with its crevices and bumpy appearance. Conversely, when the viewer is looking at a portion of the picture that is very white and "blown out" in photographer parlance, such as the sky, she would instead see bright white clouds against a slightly less bright blue, with all the shape and detail of the clouds visible.

Figure 2:
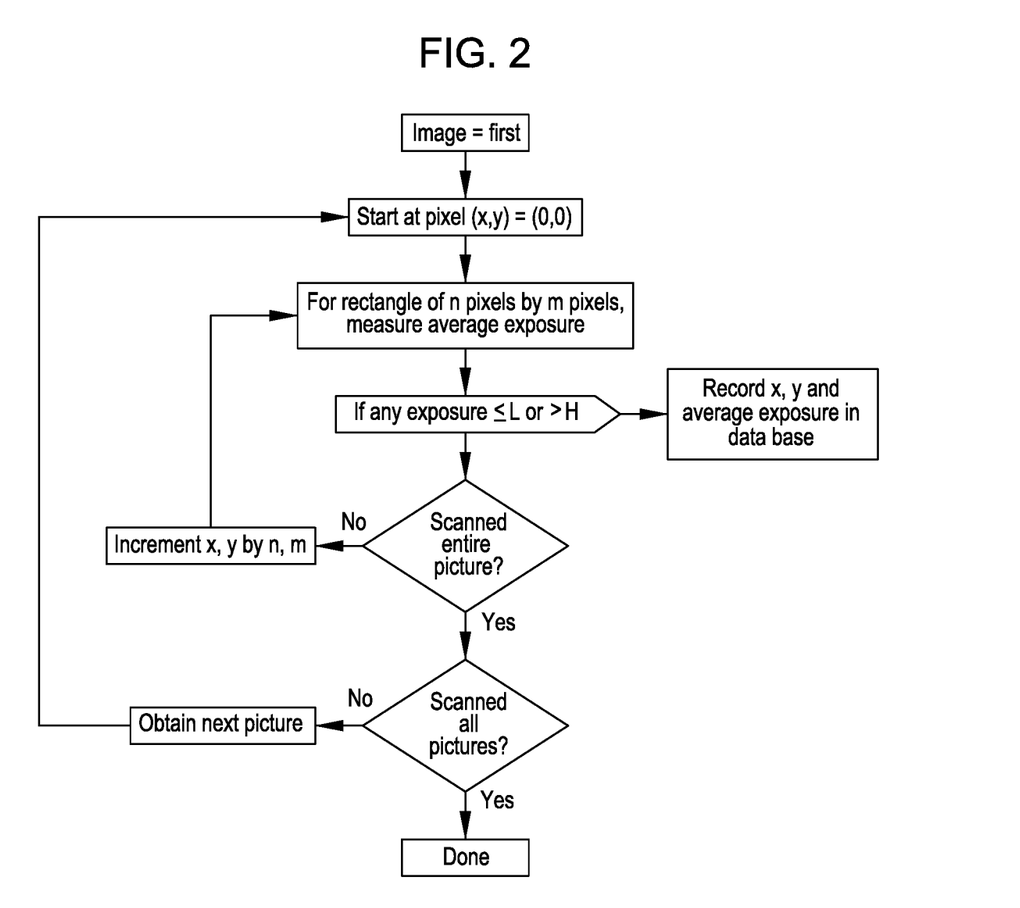
FIG. 2 is a flowchart for creating an exposure map for a set of images, according to an embodiment.

FIG. 2 shows a simple example of how the uncompressed image pixel information can be analyzed, according to an embodiment, to find areas of the image that are either underexposed or overexposed. To find an underexposed area, the average darkness of the pixels in that area is measured and compared to the average within smaller regions within that area to see if they differ by a predetermined amount. For example, if the average brightness Bavg for the entire area is 5% of maximum brightness Bmax, and if at least 75% of the regions of ten square pixels within the area vary by no more than ±2% of Bmax from the average brightness Bavg of the area, then the entire area is considered, and labeled, as being underexposed. A similar determination can be made for overexposed. For example, if the average brightness Bavg for the entire area is ≥95% of maximum brightness Bmax, and if at least 75% of the regions of ten square pixels within the area vary by no more than ±2% of Bmax from the average brightness Bavg of the area, then the entire area is considered, and labeled, as being overexposed. The x-y coordinates of these portions of the image are saved in the database 5 associated with that image. These are the portions that will be replaced later, if the viewer's gaze is directed to them, with another image (or portion thereof) in which the same portion is not underexposed or overexposed as defined above. It is noted that although example definitions of "underexposed" and "overexposed" are defined above, it is contemplated that a photographer or another person, or a software application, can define "underexposed" and "overexposed" in any suitable manner. For example, an area of an image can be "underexposed" if the average brightness Bavg of the area is less than x % of the maximum brightness Bmax that the area can have, and if at least t % of s % of the regions of m·n pixels within the area vary by no more than ±v % of Bmax from the average brightness Bavg of the area, where x can have any range such as 5-15, t can have any range such as 50-80, s can have any range such as 50-75, m·n can have any range such as 4-500 pixels$^2$, and v can have any range such as 1-10. Similarly, an area of an image can be "overexposed" if the average brightness Bavg of the area is greater than y % of the maximum brightness Bmax that the area can have, and if at least t % of s % of the regions of m·n pixels within the area vary by no more than ±v % of Bmax from the average brightness Bavg of the area, where y can have any range such as 85-95, t can have any range such as 50-80, s can have any range such as 50-75, m·n can have any range such as 4-500 pixels$^2$, and v can have any range such as 1-10. And Bmax may be the maximum digital brightness value (e.g., 255 in an 8-bit system) that a pixel can have, and Bmin may be the minimum digital brightness value (e.g., 0 in an 8-bit system) that a pixel can have.

Figure 3:
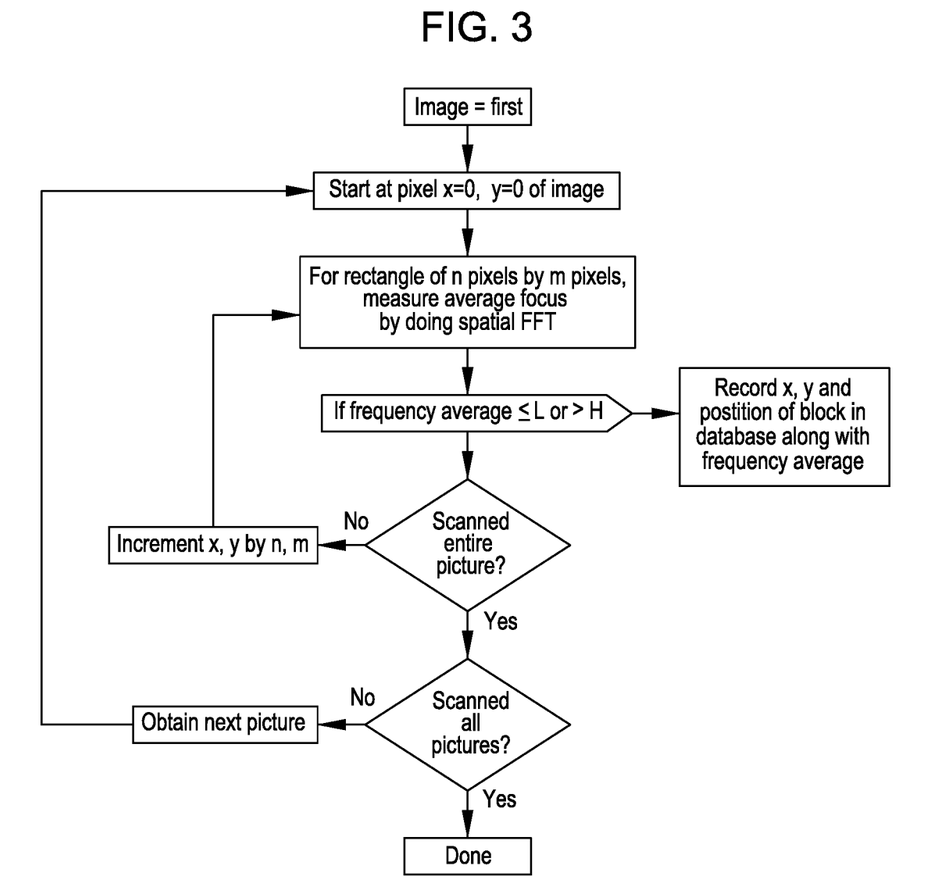
FIG. 3 is a flowchart for creating a focus map for a set of images, according to an embodiment.

FIG. 3 shows how a spatial fast Fourier transformation (FFT) is performed for sub-portions of an image to distinguish areas with high spatial variation (crisp focusing) from those with low spatial variation (unfocussed). Areas with no high frequencies of, i.e., of low, spatial variation (out of focus, underexposed (e.g., black), or overexposed (e.g., white) are marked to be replaced with another image at display time that has high frequencies in the same area. "High spatial variation H" can be predetermined, and, for example, might mean that there is a change in brightness ≥±a % in the vertical dimension or horizontal dimension of an m·n pixel block relative to the brightness of the brightest pixel within the m·n pixel block, where a can have any suitable range such as 70-95, and m·n can have any suitable range such as 4-500 pixels$^2$. Similarly, "low spatial variation L" can be predetermined, and, for example, might mean that there is a change in brightness ≤±c % in the vertical dimension or horizontal dimension of an m·n pixel block relative to the brightness of the brightest pixel within the m·n pixel block, where c can have any suitable range such as 0-30 and m·n can have any suitable range such as 4-500 pixels$^2$. It is noted that although example definitions of "high spatial variation" and "low spatial variation" are defined above, it is contemplated that a photographer or another person, or a software application, can define "high spatial variation" and "low spatial variation" in any suitable manner.

Figure 4:
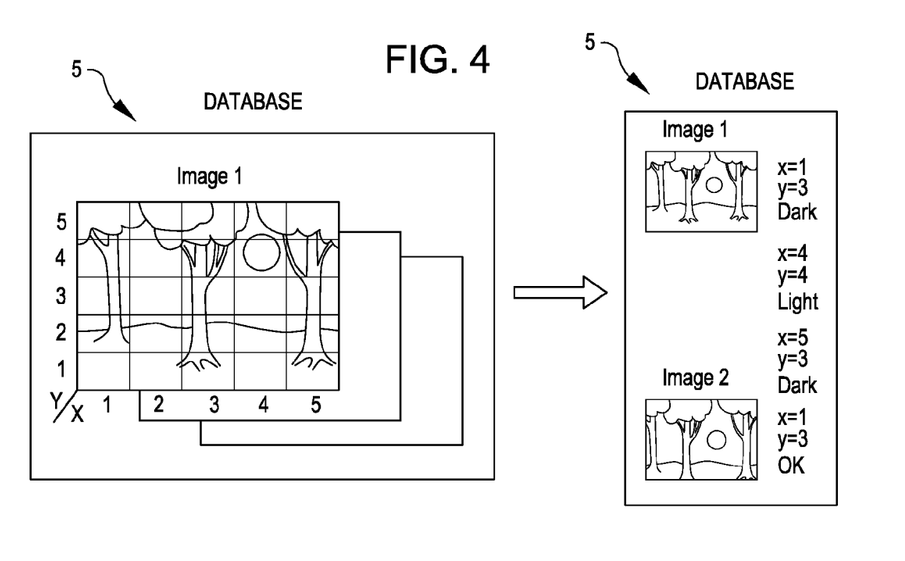
FIG. 4 shows how the exposure map for a set of images is stored, according to an embodiment.

FIG. 4 illustrates how the picture of the sun behind the trees might be broken down into rectangles of different x, y coordinates in the database. The rectangles can be small enough so that each rectangle that includes a respective portion of the tree covers the respective portion of the tree and no, or only a tiny, portion of the space between the trees. In FIG. 4, an arbitrary system of numbering the rectangles is used to refer to their location in the picture. In this case the rectangles are numbered starting from the bottom left. Each rectangle consists of many pixels (e.g., 100-500 pixels). Rectangle (1,3), where x is 1 and y is 3, is mostly underexposed because it includes a portion of the tree, and rectangle (4,4) is mostly overexposed because it includes a portion of the sun. However, rectangle (3,4) is effectively half underexposed and half overexposed because it includes both a portion of the tree and a portion of the sun; thus the algorithm would not know whether to substitute a more exposed or less exposed picture when the viewer looks at this rectangle. But if smaller rectangles are used, then this problem is less likely to occur, since a photograph interesting to the human eye contains objects that take up more pixels than a rectangle of a certain predetermined size, for example, more than 10 pixels by 10 pixels (unless the photograph is of a checkerboard of black and white squares that are exactly the same size as the rectangles, for which the probability is vanishingly small). For example, in the above situation, the computer can increase the resolution of the algorithm by breaking down the rectangle (3,4) into smaller rectangles until each rectangle is primarily overexposed or underexposed. Since the overhead of analyzing smaller rectangles with fewer pixels is trivial for many of today's computer integrated circuits (ICs) such as a microprocessor or microcontroller, there is no reason not to use smaller rectangles except that they could be smaller than the resolution of a gaze tracker or mouse or any other way the viewer might indicate where she is looking. This resolution is defined by the maximum resolution of the hardware used and the distance of the viewer from the display. Accordingly, the photographer can either specify in advance the hardware resolution and the distance, or default values will be used.

Other picture parameters can be varied and associated with any x-y area that a viewer will later view. Furthermore, if identities of particular potential viewers can be specified in advance and identified at display time, the system can accept as input which individual viewer is looking at the x-y coordinates and vary its response based on the identify of the viewer.

Steps Taken by the Image Composer.

Figure 5:
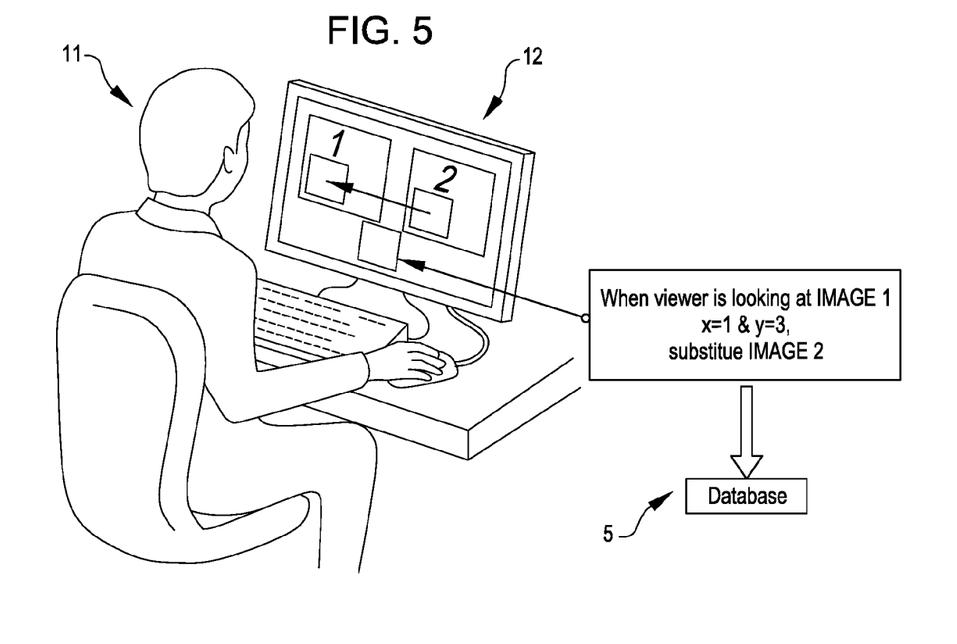
FIG. 5 shows how a composer determines how an image will change as a viewer looks at different parts of an image, according to an embodiment.

As shown in FIG. 5, using a simple user interface on a computer display 12, the photographer or other image composer 11 can quickly delineate and specify which portions of an image in the database should trigger which action (if any) when the viewer views them, or in what order, as follows:

The composer 11 is presented with a list of areas of the image likely to have an action associated with them when viewed (also referred to hereafter as "at display time"); for example, the list may include underexposed areas, overexposed areas, areas of high spatial resolution, or areas of low spatial resolution. The composer then specifies the action for each listed area. The action can be specified to be, but is not limited to, some of the following: replace the entire image or just that part of the image with another image that has a different exposure value that is, for example, neither underexposed nor overexposed; or that has a different variation of spatial frequencies that is, for example, the maximum detail for the resolution of the original camera, or is "in focus"; replace with image number x; replace with image number y if this is the nth replacement; replace with image z if area b was just looked at, etc. Different actions can be associated with each image in the database, or a set of actions associated with a primary image (see below). Actions can even be expanded to selecting images or videos available in real time, when the viewer is looking at the image, pulled from the internet or other systems.

A single photograph can be designated as the primary image that will be the image viewed and that will have all directions for when viewing an x-y rectangle within it; or any of the photographs can have these directions for when that photograph is viewed. Note that, in this example, if the composer does not specify an action, the default is "best automatic", as described below.

When the composer is finished composing all the actions that the viewer might take and all the substitutions of all or part of an image that would result, all this information is saved as one "show" or "Eyetinerary™". This show could all be stored online in the cloud, or in any other suitable electronic storage device or location.

Figure 6:
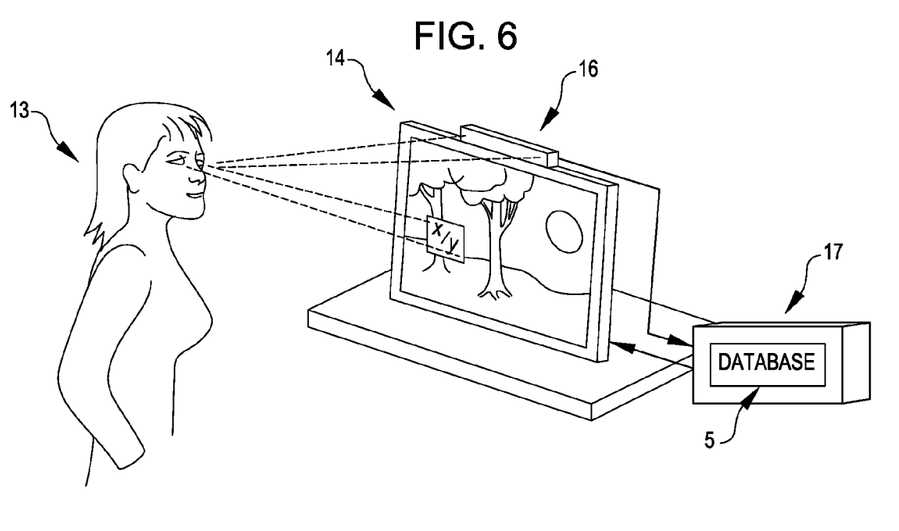
FIG. 6 shows the system causes the image to change as a viewer looks at different parts of an image, according to an embodiment.

When a viewer 13 views an image, as shown in FIG. 6, a display 14 displays a photograph from the database 5 stored in and read by a computer 17. A gaze-tracker hardware device 16 consisting, for example, of one or more cameras mounted on the display 14, gives the x-y coordinates of where in the photograph the viewer's eyes are looking. The system uses these coordinates to look up the composer's specified action in the database 5, and the system performs the action by referring to either the primary or current photograph's entry for that x-y rectangle.

If the action is the default "best automatic", the system will, for example, replace the picture the viewer is looking at with the best exposed picture for the x-y rectangle the viewer is currently viewing. "Best exposed" here, as before, is what a set of photographers would agree shows the most detail and is least "blown out" in lightness or black of which standard definitions are available. This replacement can be a quick dissolve, the nature and time of which can be specified in advance to be used when the viewer is looking, or a default value will be used.

It is important to note that the database referred to above might be stored online in the cloud as a page of html that consists of an initial image and a set of links or javascript calls that are associated with portions of that image. The gaze tracker would tell the browser where the viewer's eyes were looking, as if their eyes were a mouse, and the browser would automatically perform an action by either displaying a new image that is the target of a link, or by calling a javascript function to, for example, change some aspect of the image. In this way, the composer might need only to send a link to a viewer that points to the html page and a set of images, all within a directory on a server.

Instead of the composer specifying in advance using a user interface with a display and a pointer, instead he or she could use a display with gaze tracking hardware and specify, while looking at a particular x-y area, which other photograph (or portion thereof) to use by commands to the system through voice, or mouse, or any other method. These other correlations to the other photographs (or portions thereof) would be stored in the database. For example, if the photographer is looking at rectangle (1,3) in FIG. 4, she could say, in effect, to a voice-recognition system, "when the viewer is looking at the area I am looking at now, replace the picture shown with the picture with the filename "tree-exposed.jpg".

Additional Uses

An embodiment can be used for more than expressing an artistic intent. For example, a vision therapist might want to increase a patient's ability to coordinate her two eyes by drawing her attention back and forth on a screen. A pilot could be trained with a flight-simulator system with a display to quickly locate threatening air traffic by making such threatening aircraft appear wherever she was not looking, based on a preexisting set of images or sprites. If the viewer allows her eyes to drift apart (looking further away, towards the horizon), an embodiment could substitute a picture taken with the focus further away. Thus a viewer could train herself to focus in and out and "travel" in and out, a form of 3D.

Gaze-Tracking Image Tools.

An embodiment can be used for a gaze-tracking-based user interface (UI) for image tools. For example, the viewer tilting her head to the right could inform the system to rotate the image slowly to the right until she tilted her head back to the center. Brightness and focus could be controlled by fixating on a portion of the image. Every time the viewer blinks her left eye, the brightness could increase until it reaches a maximum and then starts down again. Focus could be increased by blinking the right eye. The process could be stopped at the desired selection by closing both eyes for one second. Similar methods could be used for cropping.

Additional Detail.

In an embodiment, if the viewer's eye concentrated on a portion of the image, that portion of the image could expand or magnify with further detail. After the image with the maximum detail or magnification is substituted, and the viewer's eyes remain fixed on that area, a link associated with that portion of the image, predetermined by the photographer, could result in other images or a video being downloaded and substituted for that portion of the image. If the photographer did not put in a specific link, the initial image looked at in that section could be transmitted to a cloud-based analyzer that could determine what the image is and supply further information, or at a minimum download and display other images of similar content captured by other photographers. For example, if the viewer was looking at a scene of Washington D.C., and let her gaze remain over the Washington Monument, the Monument might expand in size and detail to take up one half of the entire display by means of a succession of substituted images for that section of the image. If the viewer continues to stare at the Monument, a video downloaded from the internet might play on that section of the screen describing the Monument's history and construction (which might either have been specified by the photographer in advance or automatically selected by a cloud-based image recognizer).

"Flashlighting."

The photographer could specify that whatever portion of the image at which the viewer looks could be immediately modified to a higher brightness. The composer would merely have to specify "flashlight" for an x-y area. Thus it would appear that a flashlight, in effect aimed by the viewer's eyes, was playing upon the scene. Human interface testing. There are existing systems that record where a person tends to look in an image, with applications to advertising. In an embodiment, one could imagine a log being output based on how often a viewer returns to a particularly illuminated or focused portion of the image. Also, if the image composer specified a "path" of image substitutions, i.e., looking at a subportion of image A results in a substitution of image B, and looking at a portion of image B goes back to A, and the viewer repeated this path A-B-A, a log would save the information of the path and that it was repeated. Such information would be useful to the composer in further developing the viewer's interaction with the image(s).

Networking and Games with Other Viewers.

More than one gaze-tracking device can be used for games with other viewers in the same location; and the system can be connected to the internet or local network for various social purposes. For example, if more than one viewer in different locations is looking at the same Eyetinerary™, the portions looked at by a majority of viewers could be the ones magnified, or the opposite: if most people have not seen something, the Eyetinerary™ might be modified to force all the viewers to go to that image. Other types of social interaction can be implemented, such as games where two or more gaze-tracking systems award points based on the first person to look in the right place, or setting off weapons in the right place, etc. Finally, portions of the image can be shared with others on the internet by looking at the portions.

Feedback to the Composer.

An embodiment concerns a pre-determined intention of the composer to respond to where a viewer looks at display time. However, a viewer could use the system to send useful feedback to the composer in real time over a network. For example, if there's a portion of the image, say a particular person in a picture of multiple people, that the viewer would like the composer to make a substitution for, he could blink three times while looking at the person, and then drawing a circle around it with his eyes. The viewer might then say, over a network connection, "when I look at this person, I would like you to substitute another image." This location of the face would be passed to the composer along with the voice file. Thus the composer could develop a better or different Eyetinerary™ with viewer input.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed:

1. A method, comprising:
   displaying a first image of a scene with a display screen;
   capturing an image of a face of a viewer with an image-capture device as the viewer gazes at a location within the first image, a portion of the first image at the location having a sharpness;
   determining, with computing circuitry, the location in response to the captured image of the face of the viewer;
   searching, with computing circuitry, electronically stored images of one or more portions of the scene for an image portion corresponding to the portion of the first image and having a sharpness that is different than the sharpness of the portion of the first image;
   modifying, with computing circuitry, the sharpness at the location by replacing the portion of the first image with the corresponding image portion;
   capturing another image of the face of the viewer with an image-capture device;
   determining, with computing circuitry in response to the captured other image of the face of the viewer, whether the viewer is gazing at the location within the first image; and
   modifying again, with computing circuitry, the sharpness at the location by replacing the corresponding image portion with the portion of the first image in response to the computing circuitry determining that the viewer is no longer gazing at the location within the first image.

2. The method of claim 1 where the modifying includes replacing the first image with a second image that includes the corresponding image portion, where the contents of the second image are the same as the contents of the first image but with some or all pixels modified.

3. The method of claim 1 where the modifying includes changing the sharpness of closer objects within the location that appear to be in front of farther objects within the location.

4. The method of claim 1 where the modifying includes changing the sharpness of farther objects within the location that appear to be behind closer objects within the location.

5. The method of claim 1 where the modifying the sharpness includes modifying the apparent depth of field at the location.

6. The method of claim 1 where:
   the determining includes determining, with computing circuitry and in response to the captured image, whether eyes of the viewer are diverging as if the viewer is looking at a distant object; and
   in response to determining that the eyes of the viewer are diverging as if the viewer is looking at a distant object, modifying the sharpness at the location by decreasing the sharpness of closer objects at the location and increasing the sharpness of farther objects at the location.

7. The method of claim 1 wherein the modifying includes increasing the sharpness at the location to generate a region of sharper view, and moving the region of sharper view across the display screen to draw a gaze of the viewer across the display screen.

8. The method of claim 1 where the first image is a still image.

9. The method of claim 1 where the first image is part of a video stream of images.

10. The method of claim 1 where the first image is a still image with moving sprites.

11. The method of claim 1 where the first image is two dimensional.

12. The method of claim 1 where the first image is three dimensional.

13. The method of claim 1 where the modifying is according to an algorithm that is custom determined by an artist who selected the first image.

14. The method of claim 1 where the modifying is according to an algorithm that is pre-determined by a company that supplied software for selection and use by an artist or content creator who selected the first image.

15. The method of claim 1 where the modifying is according to an algorithm that is pre-determined by a company that supplied software and the algorithm works with any image or set of images.

16. The method of claim 1 where the modifying is according to an algorithm that allows an artist or content creator to specify a speed at which a gradual change modification will be performed.

17. The method of claim 1 wherein, as the sharpness at the location is modified, the sharpness at at least one other location within the first image is not modified in a same way with respect to a way in which the sharpness at the location is modified.

18. A method, comprising:
    displaying a first image of a scene with a display screen;
    capturing an image of a face of a viewer with an image-capture device as the viewer gazes at a location within the first image, a portion of the first image at the location having a brightness;
    determining, with computing circuitry, the location in response to the captured image of the face of the viewer;
    searching, with computing circuitry, a database of images of one or more portions of the scene for an image portion corresponding to the portion of the first image and having a brightness that is different than the brightness of the portion of the first image;

modifying, with computing circuitry, the brightness at the location by substituting the portion of the first image with the corresponding image portion from the database;

capturing another image of the face of the viewer with an image-capture device;

determining, with computing circuitry in response to the captured other image of the face of the viewer, whether the viewer is gazing at the location within the first image; and modifying again, with computing circuitry, the brightness at the location by replacing the corresponding image portion with the portion of the first image in response to the computing circuitry determining that the viewer is no longer gazing at the location within the first image.

19. The method of claim 18 where the modifying includes replacing the first image with a second image that includes the corresponding image portion, where the contents of the second image are the same as the contents of the first image but with some or all pixels modified.

20. The method of claim 19 where the first and second images are a pair of photographic images taken with a camera where the first and second images are substantially the same except for a difference in respective exposures of the pair of photographic images.

21. The method of claim 18 where the first image is one of a series of video images.

22. The method of claim 18 where the modifying is according to an algorithm that is custom determined by an artist who selected the first image.

23. The method of claim 18 where the modifying is according to an algorithm that is pre-determined by a company that supplied software for selection and use by an artist or content creator who selected the first image.

24. The method of claim 18 where the modifying is according to an algorithm that is pre-determined by a company that supplied software and the algorithm works with any image or set of images.

25. The method of claim 18 where the modifying is according to an algorithm that allows an artist or content creator to specify a speed at which a gradual-change modification will be performed.

26. The method of claim 18 wherein, as the brightness at the location is modified, the brightness at at least one other location within the first image is not modified in a same way with respect to a way in which the brightness at the location is modified.

27. A method, comprising:
displaying an original image of a scene with a display screen;

capturing an image of a face of a viewer with an image-capture device as the viewer gazes at a region of the displayed original image, the region having a color balance, color saturation, color depth, or contrast;

determining, with computing circuitry, the region of the displayed original image in response to the captured image of the face of the viewer;

searching, with computing circuitry, a database of images of one or more regions of the scene for an image region corresponding to the region of the displayed original image and having at least one of a color balance, color saturation, color depth, and contrast that is different than a respective at least one of the color balance, color saturation, color depth, and contrast of the region of the displayed original image;

modifying, with computing circuitry, at least one of the color balance, the color saturation, the color depth, and the contrast of the region of the displayed original image by replacing the region with the corresponding image region from the database;

capturing another image of the face of the viewer with an image-capture device;

determining, with computing circuitry in response to the captured other image of the face of the viewer, whether the viewer is gazing at the region of the displayed original image; and returning each of the modified at least one of the color balance, the color saturation, the color depth, and the contrast of the region of the displayed original image to a respective pre-modified value if the computing circuitry determines that the viewer is no longer gazing at the region of the displayed original image.

28. The method of claim 27 where the modifying includes replacing the original image with a substitute image that includes the corresponding image region, where the contents of the substitute image are the same as the contents of the original image but with some or all pixels within the corresponding image region of the substitute image modified relative to the region of the original image.

29. The method of claim 27 where the original image is a still image.

30. The method of claim 27 where the original image is one of a series of video images.

31. The method of claim 27 where the modifying is according to an algorithm that is custom determined by an artist who selected the original image.

32. The method of claim 27 where the modifying is according to an algorithm that is pre-determined by a company that supplied software for selection and use by an artist or content creator who selected the original image.

33. The method of claim 27 where the modifying is according to an algorithm that is pre-determined by a company that supplied software and the algorithm works with any image or set of images.

34. The method of claim 27 where the modifying is according to an algorithm that allows an artist or content creator to specify a speed at which a gradual-change modification will be performed.

35. A method, comprising:
displaying an original image with a display screen;

capturing an image of a face of a viewer with an image-capture device as the viewer gazes at a location within the displayed original image;

determining, with computing circuitry, the location within the displayed original image in response to the captured image of the face of the viewer;

searching, with computing circuitry, electronically stored sprites for a moving sprite corresponding to a still portion of the displayed original image at the location; and modifying, with computing circuitry, the displayed original image by replacing the still portion of the displayed original image at the location with the corresponding moving sprite such that the moving sprite moves only at the location within the displayed original image.

36. A method, comprising:
displaying an original image with a display screen;

capturing an image of a face of a viewer with an image-capture device as the viewer gazes at a location within the displayed original image;

determining, with computing circuitry, the location within the displayed original image in response to the captured image of the face of the viewer;

searching, with computing circuitry, a database for a multi-branch video corresponding to a portion of the displayed original image at the location;

modifying, with computing circuitry, the displayed original image by selecting a branch of the corresponding multi-branch video, replacing the portion of the displayed original image at the location with the selected branch of the corresponding multi-branch video, and rendering, in a viewer-perceivable manner, the selected branch of the multi-branch video within the location;

capturing another image of the face of the viewer with an image-capture device;

determining, with computing circuitry in response to the captured other image of the face of the viewer, whether the viewer is gazing at the location within the displayed original image; and returning, with computing circuitry, the portion of the displayed original image to the location within the displayed original image in response to the computing circuitry determining that the viewer is no longer gazing at the location within the displayed original image.

37. The method of claim 36 wherein replacing the portion of the original image at the location includes replacing a still portion of the original image at the location.

38. A method, comprising:

displaying an original image with a display screen;

capturing an image of a face of a viewer with an image-capture device as the viewer gazes at a location within the original image;

determining, with computing circuitry, the location within the original image in response to the captured image of the face of the viewer;

searching, with computing circuitry, electronically stored images for a still-image portion corresponding to the location within the original image; and modifying, with computing circuitry, the original image by replacing a moving sprite at the location with the corresponding still-image portion.

* * * * *